June 6, 1933.  C. H. HAVILL  1,912,840
SHOCK ABSORBER
Filed Dec. 12, 1930
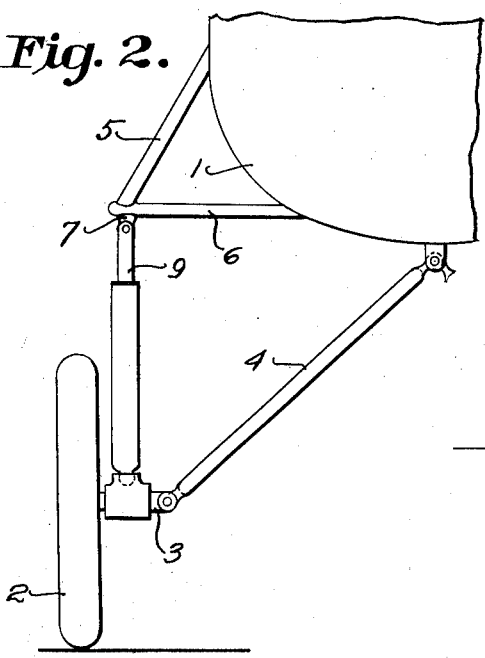
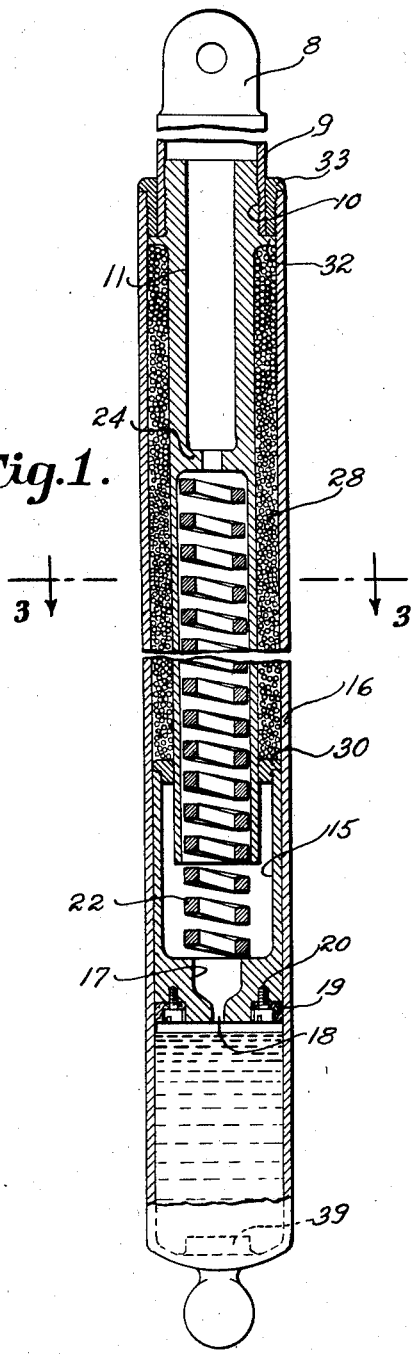
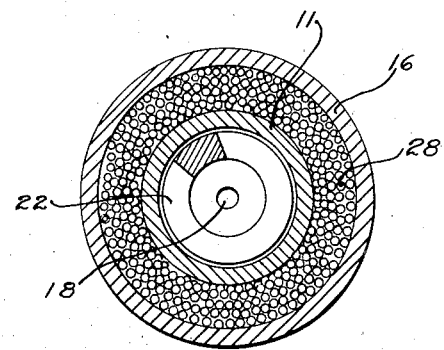
INVENTOR
Clinton H. Havill.
BY F. B. Smith.
ATTORNEY Patented June 6, 1933

1,912,840

UNITED STATES PATENT OFFICE

CLINTON H. HAVILL, OF SOUTH ORANGE, NEW JERSEY, ASSIGNOR TO BENDIX RESEARCH CORPORATION, OF EAST ORANGE, NEW JERSEY, A CORPORATION OF INDIANA

SHOCK ABSORBER

Application filed December 12, 1930. Serial No. 501,970.

This invention relates to shock absorbers and particularly to shock absorbers for use on aircraft, although not limited to such use.

One of the objects of the invention is the provision of a shock absorber adapted to assimilate the shock due to the impact of a vehicle, and which incorporates a liquid damping means, a compressible friction means, and a resilient cushioning device, the construction and arrangement of the different absorbing media being such as to obtain the most efficient damping and retarding action with the least amount of stress or strain.

Another object of the invention is to provide in a device of the foregoing character a novel combination of cushioning, retarding, and energy absorbing devices adapted to coact one with the other to produce the desired effect.

A further object of the invention is to provide a novel shock absorber in which the first movement of the parts, due to the initial major impact, is materially retarded by a dashpot action, and the remaining impact is absorbed by a combination of resilient and friction retarding means acting simultaneously.

A further object is the provision in a device of the foregoing character of a novel combination of fluid, resilient, and friction means so combined and inter-related that the resilient means starts to function to cushion the impact prior to operation of the friction means, and continues to function during the period of compression of the friction elements and preferably for a further period of time after the friction elements have reached their limit of shock absorbing ability.

Another object of the invention is to provide such a combination of resilient and friction shock absorbing means in which the resilient member is in the form of a spring and the friction means consists of a quantity of granular particles, normally loosely associated but adapted to be compressed and displaced relatively to one another during absorption of the impact.

Another object of the invention is to provide a novel shock absorbing mechanism of the foregoing character in which the spring functions alternately to absorb and expend a portion of the energy while the entrapped granular particles concurrently serve to assimilate sufficient energy to damp or minimize the amplitude of the vibrations due to successive shock to which the vehicle is subjected as it travels over an uneven terrain.

Another object is to provide a shock absorber especially adapted for, but not limited to use on aircraft, and having a novel construction of such a nature that it may be readily attached to the fuselage or body of the vehicle at one end and to the landing gear axle at the other, in such a manner as to be capable of readily yielding movement along its axis, or about either end, while the plane is in flight or while rolling on the ground.

A further object is to provide a novel shock absorber for aircraft use in which the parts are so arranged that all the stresses and pressures are relieved as soon as the plane is definitely clear of the ground.

Other objects and advantages to be derived from the use of the invention disclosed herein reside in the specific construction, relation and combination of parts as will appear more fully from the following description when read with reference to the accompanying drawing illustrating the preferred embodiment of the invention.

It is to be expressly understood, however, that said drawing is for the purpose of illustration only and is not to be construed as a definition of the limits of the invention, reference being had to the appended claims for this purpose.

In the drawing, wherein like reference characters refer to like parts throughout the several views, Fig. 1 is a central sectional view through a device embodying the invention;

Fig. 2 is a view of the device in operative relation to the portion of an airplane with which it may be associated; and Fig. 3 is a transverse sectional view taken along line 3—3 of Fig. 1.

Referring more particularly to the drawing by reference numerals, the character 1 is used as a general designating numeral for the airplane to which the invention is shown applied by way of illustration of one of its applications.

As shown the airplane landing gear comprises at each side thereof (only one side of the mechanism being illustrated) an axle member 3, connected at its inner end to the lower central portion of the fuselage by a suitable link means as indicated at 4. Extending outwardly from the fuselage is a structure composed of struts 5 and 6, at the junction of which is provided a lug 7 adapted to pivotally receive the upper flattened end 8 of rod 9, the lower end of said rod being threaded as shown in 10, (Fig. 1) to a correspondingly threaded portion on the outer surface of sleeve 11, forming one of the principal parts of the shock absorber, the said sleeve having associated therewith the novel combination of means for sequentially assimilating the shocks due to impact of the landing wheel 2 with the ground, at the end of the plane's descent.

As illustrated herewith, by way of example, this combination of elements comprises, first, a liquid cushioning means in the nature of a dashpot; secondly, a resilient yielding means, preferably a helical spring; and thirdly, a quantity of granular particles of proper hardness, capable of interchange of position among themselves when subjected to pressure and adapted to absorb a portion of the energy of impact during such interchange of position and until the pressure thereupon becomes sufficiently great to render further relative movement of the particles practically impossible.

The first, or liquid shock absorbing means, comprises a cup or thimble shaped member 15 slidably fitting the inner surface of cylindrical casing 16 and having an opening 17 in the bottom wall thereof, the said opening being preferably of a relatively narrow diameter at its lower end as indicated at 18. Attached to the under surface of the cap 15 is an annular member 19 attached by suitable means as indicated at 20, the purpose of this member being to prevent seepage of the liquid upwardly between the cup member 15 and the casing wall.

Between the cup 15 and the lower portion of the casing 16 there is provided a suitable liquid, such as oil or glycerine, which may be forced through the orifice 18 at a gradual rate upon relative movement between members 15 and 16 in a manner to be described.

The second, or resilient, means for absorbing shock of impact after the initial movement has been retarded by action of the liquid means above described, preferably comprises a coiled spring 22 resting at its lower end on the bottom wall of cup 15 and extending upwardly through the sleeve 11 into engagement with the transversely disposed partition 24. This spring 22 during normal flight is extended as shown, and is therefore adapted to be compressed upon relative movement between the sleeve 11 and the cup 15 in a manner to be described.

The third or friction means for absorbing a portion of the shock of impact comprises preferably, as above suggested, a quantity of granular particles 28 of aluminum, for example, normally loosely contained in the annular compartment formed between the outer surface of sleeve 11 and the inner surface of casing 16, the lower limit of the compartment being marked by the provision of member 30 threaded to the upper end of cup 15 and slidable along the inner wall of casing 16 with said cup. The upper limit of the compartment is likewise marked by the provision of a transverse ledge 32 preferably formed integral with the sleeve 11 and slidable with said sleeve relatively to the casing 16. This ledge 32 likewise serves in conjunction with the nut 33 as a means for retaining the assembly in place.

At the first impact with the ground, the members 9 and 16 move toward each other, resulting in transmission of energy through the spring 22. The spring being of sufficient resistance, the stress is transferred to the cup member 15 which accordingly moves downwardly in the casing 16, forcing the liquid through the orifice 18, the rate of flow being such that the downward movement of the cup is considerably retarded. When resistance offered by the liquid produces a force greater than the force of spring 22, compression begins to take place in the spring 22. This combined shock absorbing action of the liquid and spring continues until the compression of the granular particles resulting from the downward movement of the ledge 32, has absorbed all the energy of which such parts are capable, after which the cup 15 finally reaches the lower stop 39 and the spring 22 reaches its limit of compression and becomes in effect, a rigid member. During this latter portion of the absorbing action, however, and as the plane continues to roll along the ground and absorb minor shocks, the spring 22 acts to alternately absorb and give back portions of this energy by its power of compression and expansion. Also during this time, the granular particles serve to minimize the severity of the vibrations due to such movement and act in conjunction with the spring 22 to absorb such shocks. Moreover, the reduced air space in the spring chamber compresses the air into the upper chamber, through the orifice in partition 24, thereby increasing the air pressure exerted downwardly on the liquid passing through orifice 18. This increased air pressure constitutes a further retarding means, and therefore enhances the cushioning action of the liquid.

In taking off, and as soon as the wheels have definitely left the ground, their weight pulls on casing 16 thereby releasing all strains and pressures in the parts.

There is thus provided a shock absorber of novel construction which is relatively simple in structure, easy to assemble and maintain in working condition, and which possesses the added advantage of smoothness of operation, resulting from the use of the novel combination of elements above disclosed. It is to be understood, however, that the construction may be varied in any of its details, or in the relative arrangement of the parts. Thus, for example, in addition to the single ledge member 32 adapted to move through the compartment containing the granular particles there may be a number of agitating and compressing devices movable through said compartment, if it is deemed desirable to increase the absorbing ability of these friction elements. It is to be further understood that other fluids, such as air, may be used in place of liquid to obtain the fluid cushioning action.

Likewise other changes, which will now suggest themselves to those skilled in the art, may be made in the form, details of construction and arrangement of the parts without departing from the scope of the invention and reference is therefore to be had to the appended claims for a definition of such scope.

What is claimed is:

1. In a shock absorbing device for airplane landing gear, in combination with a casing adapted to move with the axles of the landing gear and having in its lower portion a chamber for retention of cushioning fluid, a sleeve connected to the body of the plane and slidable within said casing, a cup member also slidable within said casing and movable through said chamber in response to relative movement between said sleeve and casing, means for causing a relatively slow displacement of the cushioning fluid in said chamber as said cup member advances toward the lower end of said casing and compressible granular means for retarding relative movement between the sleeve and casing.

2. In a shock absorbing device for airplane landing gear, in combination with a casing adapted to move with the axles of the landing gear and having in its lower portion a chamber for retention of cushioning fluid, a sleeve connected to the body of the plane and slidable within said casing, a cup member also slidable within said casing and movable through said chamber in response to relative movement between said sleeve and casing, and resilient means interposed between said cup member and sleeve and adapted to supplement the cushioning action of said fluid as said cup member advances toward the lower end of said casing.

3. In a shock absorbing device for airplane landing gear, in combination with a casing adapted to move with the axles of the landing gear and having in its lower portion a chamber for retention of cushioning fluid, a sleeve connected to the body of the plane and slidable within said casing, a cup member also slidable within said casing, and friction means interposed between said sleeve and casing and adapted to supplement the cushioning action of said fluid as said cup member advances toward the lower end of said casing.

4. In a device of the class described in combination with a movable member and a surrounding casing containing cushioning fluid adapted to retard the progress of said movable member, a second member movable in said casing and provided with a passage permitting relatively slow displacement of said cushioning fluid, a resilient cushioning member interposed between said first and second named members, and a third impact absorbing means interposed between said first named member and said casing.

5. In a device of the class described in combination with a movable member and a surrounding casing containing cushioning fluid adapted to retard the progress of said movable member, a second member movable in said casing and provided with a passage permitting relatively slow displacement of said cushioning fluid, a resilient cushioning member interposed between said first and second named members, an annular compartment containing compressible granular particles formed by said first named member and said casing, and means on said first named member for compressing said particles during displacement of said cushioning fluid.

6. In a device of the class described, in combination, liquid shock absorbing means, spring means coacting therewith, and granular friction means, and a telescoping casing housing each of said means in cooperative relation.

7. In a device of the class described in combination with a movable member and a surrounding casing containing cushioning fluid adapted to retard the progress of said movable member, a second member movable in said casing and provided with a passage permitting relatively slow displacement of said cushioning fluid, a coiled spring interposed between said first and second named members, an annular compartment containing compressible granular particles formed by said first named member and said casing, and means on said first named member for compressing said particles during displacement of said cushioning fluid, and compression of said coiled spring.

8. In a device of the class described, in combination with a movable member and a surrounding casing containing cushioning fluid adapted to retard the progress of said movable member, a second member movable in said casing and provided with a passage permitting relatively slow displacement of said cushioning fluid, a coiled spring interposed between said first and second named members, an annular compartment containing compressible granular particles formed by said first named member and said casing, and means on said first named member for compressing said particles during displacement of said cushioning fluid and compression of said coiled spring, said spring being adapted to alternately expand and contract to absorb subsequent shocks, after displacement of said cushioning fluid.

9. In a device of the class described, in combination with a movable member and a surrounding casing containing cushioning fluid adapted to retard the progress of said movable member, a second member movable in said casing and provided with a passage permitting relatively slow displacement of said cushioning fluid, a coiled spring interposed between said first and second named members, an annular compartment containing compressible granular particles formed by said first named member and said casing, and means on said first named member for compressing said particles during displacement of said cushioning fluid and compression of said coiled spring, such subsequent shocks being further damped by the alternate agitation and compression of said granular particles.

10. In a device of the class described, the combination of a pair of relatively movable members, liquid means for retarding relative movement of the members, resilient means for resisting movement of the members, friction means coacting between the members, and said members forming a closed air filled chamber above the liquid adapted to be varied in volume by relative movement of the members.

11. In a device of the class described, the combination of a pair of telescopic tubular members, liquid means for retarding relative movement of the members, resilient means for resisting movement of the members, granular friction means intermediate the members, and said members forming a closed air filled chamber above the liquid adapted to be varied in volume by relative movement of the members.

12. A shock absorber comprising two relatively movable parts and means for resisting movement therebetween, including a variable volume gas filled container, liquid cushioning means, a friction device, and a spring, all of which simultaneously cooperate in the operation of the shock absorber.

In testimony whereof I have signed this specification.

CLINTON H. HAVILL.